Dec. 27, 1927.
L. JOHNSON
ROLL ADJUSTING MEANS
Filed May 15, 1925
Fig.1.
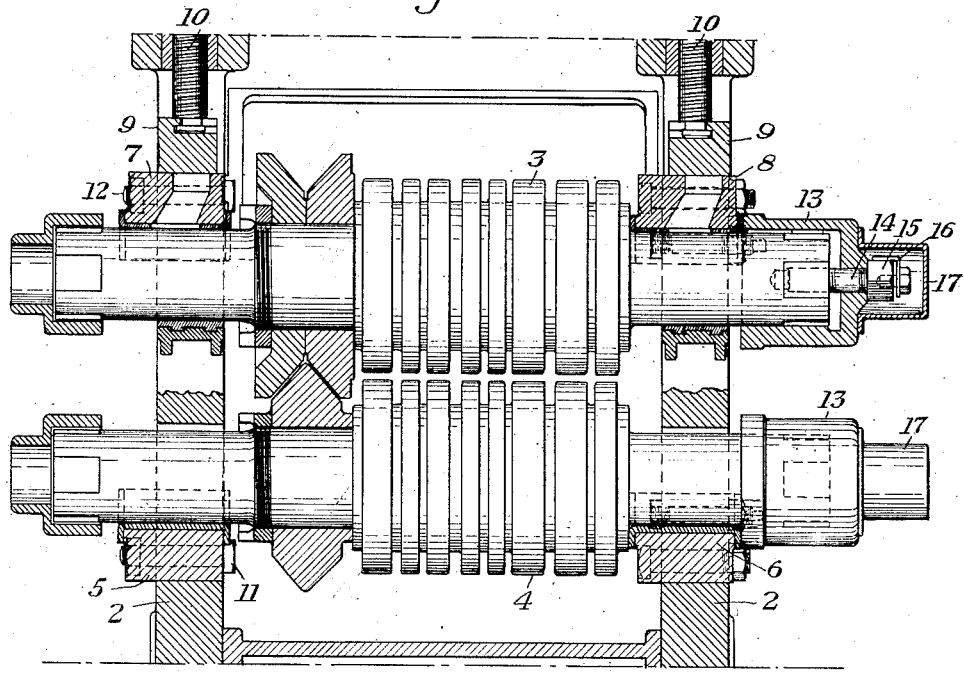
Fig.2.
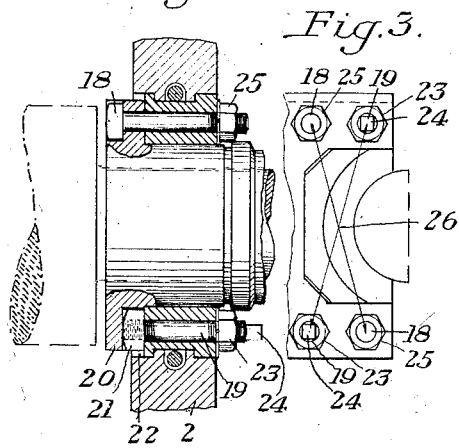
Fig.3.
Fig.4.
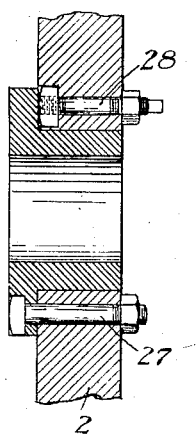
INVENTOR
Lane Johnson Patented Dec. 27, 1927.

1,653,709

UNITED STATES PATENT OFFICE.

LANE JOHNSON, OF INGRAM, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

ROLL-ADJUSTING MEANS.

Application filed May 15, 1925. Serial No. 30,587.

The present invention relates to means for axially adjusting rolls. In certain classes of work longitudinal adjustment of the rolls is necessary. This is particularly true of the rolls of machines for straightening metal bars and shapes, such as I-beams, channels and the like, as it is desirable in machines of this character to very accurately align the passes of the upper and lower rolls and to maintain such alignment.

By the present invention I provide means for clamping each roll in one of its bearings and means for adjusting the bearing in and out in the roll housing and for holding it in adjusted position, the roll being adapted to slide in its other bearing which is held against axial movement.

A preferred embodiment of the invention is shown in the accompanying drawings wherein—

Figure 1 is a vertical sectional view through the bearings of an upper and a lower roll of a straightening machine;

Figure 2 is a horizontal section through the right hand bearing of the upper roll;

Figure 3 is an end view of the bearing shown in Figure 2; and

Figure 4 is a horizontal sectional view through the right hand bearing of the lower roll.

Referring to Figure 1, 2 designates the roll housings of a straightening machine and 3 and 4 upper and lower straightening rolls, it being understood that the lower roll is not in the same vertical plane as the upper roll. The lower roll is journaled in bearing blocks 5 and 6, and the upper roll in bearing blocks 7 and 8, the latter being mounted in the usual riders 9 which are engaged by the adjusting screws 10.

The left hand bearing 5 of the lower roll is bolted to the roll housing by bolts 11, and the left hand bearing 7 of the upper roll is bolted to the rider 9 by bolts 12. The bearing blocks 5 and 7 are thus held against axial movement and the roll necks at the left hand ends of the rolls are adapted to slide in these bearing blocks when the rolls are longitudinally adjusted by the means hereinafter to be described.

The roll neck at the right hand end of each roll has a cap 13 fitted over the same and keyed thereto. A bolt 14 is screwed into the end of the roll neck and projects through an opening in the end of the cap and has a nut 15 mounted on its outer screw threaded end and adapted to be held from turning by a suitable locking device 16. A cover 17 is removably secured to the outer end of the cap. By removing the cover 17 and tightening the nut 15 the right hand bearing block is adapted to be firmly clamped between the right hand end of the roll and the cap. Since the cap is keyed to the roll neck it will revolve with the roll.

Referring to Figures 2 and 3, the bearing 8 and rider 9 of the upper roll have two bolts 18 extending through the same. The rider 9 has two thrust screws 19 extending through the same and engageable with a flange 20 of the bearing. The screw threaded inner end of each thrust screw is engaged by a nut 21 held against turning in a recess 22 formed partly in the roll housing and partly in the flange 20. The outer screw threaded end of each thrust screw is engaged by a nut 23. Each thrust screw has a wrench engaging portion 24 projecting beyond its outer screw threaded end. In order to move the upper roll towards the left, the nuts 25 on the bolts 18 and the nuts 23 on the thrust screws 19 are first backed off and then the thrust screws 19 are screwed inwardly. Since these thrust screws abut against the flange 20 they will cause the sleeve to move towards the left in the rider 9. When the proper adjustment has been made in this manner the nuts 23 and 25 will be tightened to hold the parts in adjusted position. When it is desired to adjust the upper roll to the right, the thrust screws 19 will be screwed outwardly in order to move their inner ends away from the flange 20 and then the nuts 25 will be tightened up to draw the bearing 8 towards the right. When the roll has been adjusted in this manner to the desired extent the thrust screws 19 will be screwed inwardly again to engage the flange 20 and the nuts 23 tightened to hold the parts in adjusted position.

It will be noted by reference to Figure 3, that a line connecting the centers of the bolts 18 intersects a line connecting the centers of the thrust screws 19 in a point 26 which represents substantially the center of mass of the bearing block 8. Therefore, when the two thrust screws are operated to thrust the bearing inwardly or the nuts 25 tightened up to pull the bearing outwardly, there will be no tendency to cant the bearing block.

By reference to Figure 4 it will be seen that the means for adjusting the lower roll is the same as for adjusting the upper roll, the only difference being that the bolts 27 and thrust screws 28 extend through the roll housing instead of through a rider.

While I have shown and described a preferred embodiment of my invention, it will be understood that the invention is not limited to its illustrated embodiment but that it may be otherwise embodied within the scope of the appended claims without departing from the spirit of the invention.

I claim:

1. In roll adjusting means, the combination with a roll having a roll neck projecting from each end thereof, of a bearing engageable with one of said roll necks and in which the same is adapted for axial movement, a bearing engageable with the other of said roll necks, means engageable with said last-mentioned roll neck for clamping said last-mentioned bearing between the same and an end of the roll, and means for adjusting said last-mentioned bearing axially, substantially as described.

2. In roll adjusting means, the combination with a roll housing and bearings mounted therein, of a roll having roll necks projecting from its opposite ends and journaled in said bearings, the roll being adapted for axial movement in one of said bearings, means for preventing axial movement of said bearing in said housing, means for clamping the other bearing against an end of the roll comprising a cap fitting over the end of the roll neck and engageable with said bearing and means engageable with the roll neck and cap for forcing the cap against the bearing, and means for adjusting said bearing axially in said housing and for holding it in adjusted position, substantially as described.

3. In roll adjusting means, the combination with a roll housing and bearings mounted therein, of a roll having roll necks projecting from its opposite ends and journaled in said bearings, said roll being adapted for axial movement in one of said bearings, means for holding said last-mentioned bearing against axial movement in said housing, means for holding the roll against longitudinal movement in the other of said bearings, and means for adjusting the said last-mentioned bearing axially in said housing, comprising a plurality of thrust screws engageable with said bearing for moving the same in one direction and a plurality of tension screws engageable with said bearing for moving the same in the opposite direction, said thrust screws and tension screws being so arranged as to prevent canting of the bearing during adjustment thereof, substantially as described.

4. In roll adjusting means, the combination with a roll and its bearings of a cap fitting over one end of the roll and secured thereto, and means connecting the roll and the cap, said means being effective for adjusting the position of the cap endwise with respect to the roll, substantially as described.

5. In roll adjusting means, the combination with a roll and its bearings of a stud projecting from one end of the roll, a member projecting from the stud to a roll bearing, and means on the stud for shifting the position of the member along the stud so as to adjust the roll axially.

6. In roll adjusting means, the combination with a roll having necks and bearings on the necks, of a separate member secured to the roll neck beyond the bearing, the member cooperating with the body of the roll for preventing endwise movement of the necks in the bearing, and means for adjusting the bearing axially, substantially as described.

7. The combination with a roll having a body and a neck, of a bearing of such length that a portion of the neck projects beyond the bearing, a cap fitting over the projecting portion of the neck and cooperating with the roll body to prevent relative endwise movement of the bearing and the neck, and means for adjusting the bearing endwise, substantially as described.

8. The combination with a roll having a body and a neck, of a bearing of such length that a portion of the neck projects beyond the bearing, a cap fitting over the projecting portion of the neck and cooperating with the roll body to prevent relative endwise movement of the bearing and the neck, a stud bolt projecting from the end of the roll for holding the cap in place, and means for adjusting the bearing endwise, substantially as described.

9. In roll adjusting means, the combination with a roll having necks and bearings on the necks, a neck projecting beyond its bearing, of a cap fitting over the projecting neck and engaging the bearing, the cap being deeper than the length of the projecting portion of roll neck, a stud projecting from the end of the roll neck and passing through the cap and adjustable/ means on the stud for holding the cap in place.

In testimony whereof I have hereunto set my hand.

LANE JOHNSON.